United States Patent
Teyssier et al.

(10) Patent No.: US 9,147,115 B2
(45) Date of Patent: Sep. 29, 2015

(54) METHOD AND DEVICE FOR DETECTING AN OBJECT IN AN IMAGE

(71) Applicant: STMicroelectronics (Grenoble 2) SAS, Grenoble (FR)

(72) Inventors: Jeremie Teyssier, Grenoble (FR); Michel Sanches, Le Pont de Claix (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 259 days.

(21) Appl. No.: 13/864,070

(22) Filed: Apr. 16, 2013

(65) Prior Publication Data

US 2013/0287254 A1 Oct. 31, 2013

(30) Foreign Application Priority Data

Apr. 25, 2012 (FR) ................................. 12 53810

(51) Int. Cl.
G06K 9/00 (2006.01)
G06K 9/03 (2006.01)
G06K 9/46 (2006.01)
G06K 9/62 (2006.01)
H04N 5/14 (2006.01)

(52) U.S. Cl.
CPC ........ G06K 9/00771 (2013.01); G06K 9/00228 (2013.01); G06K 9/036 (2013.01); G06K 9/4647 (2013.01); G06K 9/6215 (2013.01)

(58) Field of Classification Search
USPC ......... 382/100, 103, 107, 117–118, 162, 168, 382/173, 181, 191–194, 199, 209, 219, 382/224–225, 232, 254, 274, 276, 286–291, 382/305, 312; 348/700
See application file for complete search history.

(56) References Cited

U.S. PATENT DOCUMENTS

| | | | |
|---|---|---|---|
| 6,545,727 B1 * | 4/2003 | Pau et al. | 348/700 |
| 7,020,337 B2 * | 3/2006 | Viola et al. | 382/224 |
| 7,031,499 B2 * | 4/2006 | Viola et al. | 382/118 |
| 7,099,510 B2 * | 8/2006 | Jones et al. | 382/225 |
| 7,197,186 B2 | 3/2007 | Jones et al. | |
| 7,212,651 B2 | 5/2007 | Viola et al. | |
| 8,160,309 B1 | 4/2012 | Tzur et al. | |
| 8,233,789 B2 | 7/2012 | Brunner | |
| 2003/0053664 A1 * | 3/2003 | Pavlidis et al. | 382/117 |
| 2006/0104488 A1 * | 5/2006 | Bazakos et al. | 382/118 |
| 2010/0158388 A1 | 6/2010 | Bookout et al. | |
| 2011/0181511 A1 | 7/2011 | Yang et al. | |

OTHER PUBLICATIONS

Darrell, T. et al., "Integrated Person Tracking Using Stereo, Color, and Pattern Detection," International Journal of Computer Vision 37(2), 2000, Kluwer Academic Publishers, 11 pages.

Fossati, A. et al., "Bridging the Gap between Detection and Tracking for 3D Monocular Video-Based Motion Capture," Computer Vision Laboratory, http://cvlab.epfl.ch, Lausanne, Switzerland, 8 pages.

Garcia-Mateos, G. et al., "Human Face Processing with 1.5D Models," Universidad de Murcia, Murcia, Spain, 2007, 16 pages.

(Continued)

*Primary Examiner* — Seyed Azarian
(74) *Attorney, Agent, or Firm* — Slater & Matsil, L.L.P.

(57) ABSTRACT

A method for detecting at least one object in an image including a pixel array, by means of an image processing device, including searching out the silhouette of the object in the image only if pixels of the image are at the minimum or maximum level.

26 Claims, 2 Drawing Sheets

(56) References Cited

OTHER PUBLICATIONS

Han, J. et al., "Fusion of color and infrared video for moving human detection," Science Direct, The Journal of the Pattern Recognition 40, 2007, www.sciencedirect.com, 14 pages.

Lee, L. et al., "Gait Analysis for Recognition and Classification," MIT Artificial Intelligence Lab, Cambridge, MA, 2002, 8 pages.

Li, J. et al., "Face Detection Using SURF Cascade," PowerPoint Presentation from Intel Labs China, Nov. 6-13, 2011, 17 pages.

Moran, L. et al., "Lips Shape Extraction Via Active Shape Model and Local Binary Pattern," Centro Nacional de Investigacion y Desarrollo Technologico, 2007, 10 pages.

Nadimi, S. et al., "Physical Models for Moving Shadow and Object Detection in Video," IEEE Transactions on Pattern Analysis and Machine Intelligence, vol. 26, No. 8, Aug. 2004, 9 pages.

Papageorgiou, C. et al., "A General Framework for Object Detection," Center for Biological and Computational Learning, Artificial Intelligence Laboratory MIT, 1998, 8 pages.

Sacco, Elisa, "Image Preprocessing Methods for Face Recognition Applications," Universita Di Genova, Mar. 12, 2010, 118 pages.

Trew, T.I.P. et al., "Automatic Face Location to Enhance Videophone Picture Quality," 12469 Proceedings of the British Machine Vision Conference, Sep. 22-24, 1992, 10 pages.

Venkatesh, B. et al., "Fast Bounding Box Estimation based Face Detection," ECCV, Workshop on Face Detection, 2010, 14 pages.

Viola, P. et al., "Robust Real-time Object Detection," Second International Workshop on Statistical and Computational Theories of Vision-Modeling, Learning, Computing, and Sampling, Vancouver, Canada, Jul. 13, 2001, 25 pages.

Viola, P. et al., "Rapid Detection using a Boosted Cascade of Simple Features," Accepted Conference on Computer Vision and Pattern Recognition, 2001, 9 pages.

* cited by examiner

METHOD AND DEVICE FOR DETECTING AN OBJECT IN AN IMAGE

TECHNICAL FIELD

The present disclosure relates to a method and a device for automatically detecting at least one object, for example, a person's face, in an image.

BACKGROUND

For certain applications, it is desirable to detect the presence of at least one object in a flow of images provided by a video sensor, for example, a camera. An example of application is video surveillance.

Detection methods are generally designed according to the nature of the object to be detected in the images. In particular, in the case of people detection, methods of face detection in images have been developed. An example of a face detection method implements Viola and Jones' algorithm. A face detection algorithm generally provides a score representative of the likeliness for a face to have been detected in the image.

A disadvantage of known object detection methods is that, in certain cases, the method cannot detect the presence of objects in the image even though an object is actually present. This corresponds to a detection failure.

Further, another disadvantage of known methods of object detection in images is that, in certain cases, these methods may indicate that an object has been detected in the image even though no object is present in the image. This corresponds to a wrong detection.

It is thus desirable to provide a method of object detection in an image which both has a decrease detection failure rate and a decreased wrong detection rate.

SUMMARY OF THE INVENTION

Thus, an embodiment provides a method for detecting at least one object in an image at least partly overcoming some of the disadvantages of known methods.

Another embodiment provides a method for detecting at least one object in an image, for which the number of wrong detections is decreased.

Another embodiment provides a method for detecting at least one object in an image, for which the number of detection failures is decreased.

Another embodiment provides a method compatible with current frequencies of image acquisition by cameras.

Thus an embodiment provides a method for detecting at least one object in an image comprising a pixel array, by means of an image processing device, comprising searching out the silhouette of the object in the image only if pixels of the image are at the minimum or maximum level.

According to an embodiment, the method comprises the successive steps of: (a) searching out the object in the image; and (b) searching out the silhouette of the object in the image if, at step (a), the object has not been found in the image.

According to an embodiment, step (a) comprises providing a first score and step (b) comprises providing a second score and, at step (b), the presence of the object in the image is determined based on the first and second scores.

According to an embodiment, the method further comprises the step of (c) determining whether pixels of the image are at the minimum or maximum level.

According to an embodiment, step (c) comprises the steps of acquiring at least one additional image at an exposure or under a lighting different from those of said image and determining whether pixels of the image are at the minimum or maximum level based on an analysis of the image and of the additional image.

According to an embodiment, said image is acquired with a first exposure time t0, step (c) comprising acquiring an additional image at a second exposure time $t_1$ different from first exposure time $t_0$, determining a first mean level $G_0$ of the pixels of said image, determining a second mean level $G_1$ of the pixels of the additional image, and determining a parameter BL by the following relation: $BL=|G_0*t_1-G_1*t_0|$.

According to an embodiment, at step (c), it is determined that image pixels are at the minimum or maximum level if parameter BL is greater than a threshold.

According to an embodiment, the method is implemented for the detection of the object in each image from among successive images acquired by an image sensor at an image acquisition frequency, step (c) being carried out for some of the successive images at a frequency strictly smaller than the acquisition frequency.

According to an embodiment, the method further comprises the step of (d) acquiring additional images at different exposures or lightings with respect to said image and searching out the object and the silhouette of the object in the additional images.

According to an embodiment, said image is acquired with a first acquisition time and, at step (d), one of the additional images is acquired with a third exposure time strictly greater than the first exposure time and another one of the additional images is acquired with a fourth exposure time strictly smaller than the first exposure time.

According to an embodiment, the object to be detected is a face.

Another embodiment provides a device for detecting an object in an image, comprising a processing unit and a memory capable of storing said image, the processing unit being coupled to the memory and being configured to search out the silhouette of the object in the image only if image pixels are at the minimum or maximum level.

The foregoing and other features and advantages will be discussed in detail in the following non-limiting description of specific embodiments in connection with the accompanying drawings.

BRIEF DESCRIPTION OF THE DRAWINGS

For clarity, the same elements have been designated with the same reference numerals in the different drawings.

DETAILED DESCRIPTION OF ILLUSTRATIVE EMBODIMENTS

In the following description, only those elements which are useful to the understanding of the embodiments are shown and described. In particular, the face detection algorithms have not been detailed.

In the following description, embodiments of methods are described for the detection of at least one object in images of an image flow delivered by an image sensor, for example, a camera. It should however be clear that the embodiments of detection methods may be implemented in the case of the detection of objects in a single image, for example, provided by a photographic camera. Further, in the following description, embodiments of methods are described for the detection of people in images. It should however be clear that the embodiments of detection methods may be implemented for the detection of other objects than people in images, for example, for the detection of vehicles.

Figure 1:
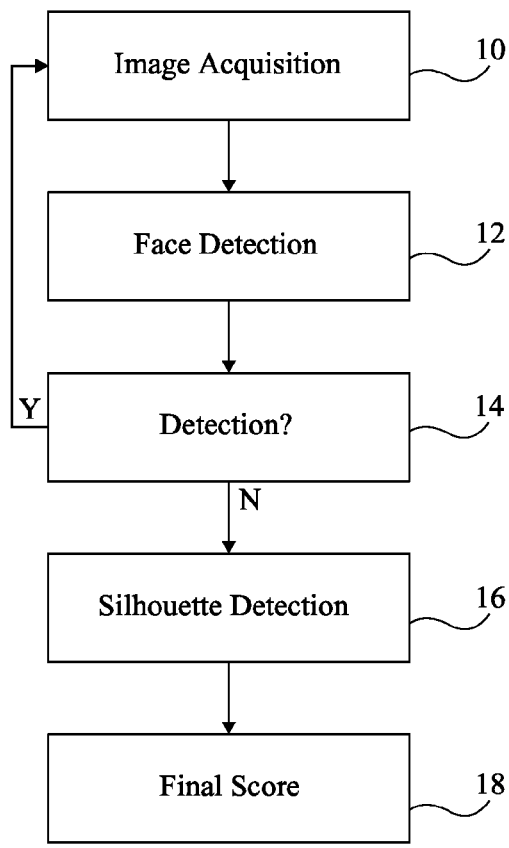
FIG. 1 shows, in the form of a block diagram, an example of a method for detecting objects in an image.

FIG. 1 shows, in the form of a block diagram, an example of a method for detecting at least one person in images.

At step 10, an image is acquired by an image sensor. The image sensor may be a camera capable of acquiring new images, for example, at an acquisition frequency ranging from 10 Hz to 100 Hz. The image may be a color image or an image in grey levels. In the rest of the description, for simplification, examples are described in more detail with grey level images.

An image processing step may be provided. As an example, a processing may be performed to increase the image contrast. As an example, the image processing corresponds to a gamma correction. It is considered that the image comprises N rows and M columns of pixels and that each pixel of index i and j, where i varies between 1 and N and j varies between 1 and M, has an associated grey level value $G_{i,j}$. As an example, value $G_{i,j}$ may vary between 0 (which corresponds to a black pixel) and 1 (which corresponds to a white pixel). Generally, value $G_{i,j}$ may be coded over 8 bits, which enables to code 256 shades of grey.

The gamma correction may comprise assigning the pixel a new grey level value $G'_{i,j}$ by the following relation (1):

$$G'_{i,j} = G_{i,j}^{1/\gamma} \qquad (1)$$

where γ is a real number which varies, for example, from 2 to 2.7.

The method continues at step 12.

At step 12, an algorithm of face detection in the image is implemented. It may be a multi-scale detection algorithm which provides searching for the possible presence of a face in the image by exhaustively scanning the image, at all positions and at all possible search scales. These generally are complex algorithms which directly or indirectly search out patterns characteristic of faces. According to an example, the method may implement Viola and Jones' algorithm, for example described in publication "Robust Real-time Object Detection" by Paul Viola and Michael Jones (Second International Workshop On Statistical And Computational Theories Of Vision—Modeling, Learning, Computing, And Sampling, Vancouver, Canada, July 13, 201). According to another example, the method may implement the detection algorithm described in publication "Partially Parallel Architecture for AdaBoost-Based Detection With Haar-like Features" of Hiromote et al. (IEEE transactions on circuits and systems for video technology, VOL. 19, No. 1, January 2009). According to another example, the method may implement the detection algorithm described in publication "Face Detection by Cascade of Gaussian Derivates Classifiers Calculated with a Half-Octave Pyramid" of Ruiz-Hermandez et al. According to another example, the method may implement the detection algorithm described in publication "Fast Human Detection Using a Cascade of Histograms of Oriented Gradients" of Qiang Zhu et al.

The face detection algorithm can deliver a value, which will be called Score hereafter, representative of the likeliness of detection of a face in the image. The higher value Score, the higher the likeliness of detection of a face in the image. The method carries on at step 14.

At step 14, it is determined whether a face has been detected or not in the image based on value Score. This may be obtained by comparing value Score with a threshold Detection_Th. When value Score is greater than or equal to threshold Detection_Th, it is considered that at least one face has been detected in the image. An indication of the fact that a face has been detected may be delivered to the user. The method then continues at step 10. When value Score is strictly smaller than threshold Detection_Th, one cannot decide at this stage whether or not a face is present in the image. The method then continues at step 16.

At step 16, an algorithm of silhouette detection in the image may be implemented. An algorithm of detection of the silhouette of a person's head is generally less complex than a face detection algorithm since only data relative to the outlines of the objects present in the image are used by the silhouette detection algorithm. In the rest of the description, terms silhouette or outline will be indifferently used.

As an example, the silhouette detection algorithm may compare the image or a portion of the image with a reference image corresponding to the silhouette of a person's head to determine whether the analyzed image or image portion corresponds to the silhouette of a person's head.

An example of silhouette detection algorithm is the following. For each column of index j of the pixel array of the image, a value $x_j$ is determined by the following relation (2):

$$x_j = \sum_{i=1}^{N} G'_{i,j} \qquad (2)$$

The mean value $\bar{x}$ of values $x_j$ is further determined for j varying from 1 to M.

The reference image comprises N rows and M columns of pixels and each pixel of index i and j, where i varies from 1 to N and j varies from 1 to M, has an associated grey intensity value $Gref_{i,j}$. For each column of the reference image of index j, a value $xref_j$ is determined by the following relation (3):

$$xref_j = \sum_{i=1}^{N} Gref_{i,j} \qquad (3)$$

Call $\overline{xref}$ the mean value of values $xref_j$ for j varying from 1 to M. The silhouette detection algorithm determines a column correlation coefficient Xcorr by the following relation (4):

$$Xcorr = \frac{\sum_{j=1}^{M} (x_j - \bar{x}) * (xref_j - \overline{xref})}{\sqrt{\sum_{j=1}^{M} (x_j - \bar{x})^2} \sqrt{\sum_{j=1}^{M} (xref_j - \overline{xref})^2}} \qquad (4)$$

Similarly, for each line of index i of the pixel array of the image, a value $y_i$ is determined by the following relation (5):

$$y_i = \sum_{j=1}^{M} G'_{i,j} \qquad (5)$$

The mean $\bar{y}$ of values $y_i$ is further determined for i varying from 1 to N.

For each line of the reference image of index i, a value $yref_i$ is determined by the following relation (6):

$$yref_i = \sum_{j=1}^{M} Gref_{i,j} \quad (6)$$

Call $\overline{y}ref$ the mean of values $yref_i$ for i varying from 1 to N. The silhouette detection algorithm determines a line correlation coefficient Ycorr by the following relation (7):

$$Ycorr = \frac{\sum_{i=1}^{N}(y_i - \overline{y}) * (yref_i - \overline{y}ref)}{\sqrt{\sum_{i=1}^{N}(y_i - \overline{y})^2} \sqrt{\sum_{i=1}^{N}(yref_i - \overline{y}ref)^2}} \quad (7)$$

The silhouette detection algorithm can then determine a general correlation coefficient GCorr by the following relation (8):

$$GCorr = \alpha * Xcorr + (1-\alpha) * Ycorr \quad (8)$$

where $\alpha$ is a real number that may vary from 0 to 1 and enabling to adjust the prevalence between the row direction and the column direction. When $\alpha$ is equal to 0.5, this means that an equal importance is assigned to the row direction and to the column direction. General correlation coefficient GCorr is a real number that may vary from 0 to 1. The method continues at step 18.

At step 18, if general correlation coefficient GCorr is smaller than or equal to a threshold, for example, 0.5, it is considered that no face is present in the image. If general correlation coefficient GCorr is strictly greater than a threshold, for example, 0.5, it is considered that there is a high likeliness of detection of a person's head silhouette in the image. In this case, a new score NewScore may be determined by the following relation (9):

$$NewScore = Score + \beta * GCorr \quad (9)$$

where $\beta$ is a real number. Number $\beta$ and threshold Detection_Th are, for example, selected to obtain a successful detection when the reference image of the silhouette detection algorithm is used.

In the case where value NewScore is greater than or equal to threshold Detection_Th, it is considered that a face has been detected in the image. In the case where value NewScore is strictly smaller than threshold Detection_Th, it is considered that no face is present in the image.

The face and silhouette detection algorithms may be multi-scale algorithms since they are capable of detecting the presence of faces or of silhouettes in an image at different scales. As a variation, only the face detection algorithm is a multi-scale algorithm and the silhouette detection algorithm is an algorithm only applied to the search window for which the detection of a face by the face detection algorithm has succeeded.

The rate of successful detection of the method comprising previously-described steps 10 to 18 is increased with respect to a detection method where only a face detection algorithm is implemented. However, a disadvantage of the detection method comprising previously-described steps 10 to 18 is that the number of wrong detections is increased with respect to a detection method where only a face detection algorithm is implemented.

The present inventors have shown that a large number of wrong detections of the detection method comprising previously-described steps 10 to 18 are obtained when the silhouette detection algorithm is implemented in bad conditions, for example, with low-contrast images.

An embodiment of the face detection method comprises implementing the silhouette detection algorithm only in cases where this algorithm is capable of operating properly and of not implementing the silhouette detection algorithm in cases where there is a risk for this algorithm not to operate properly.

Figure 2:
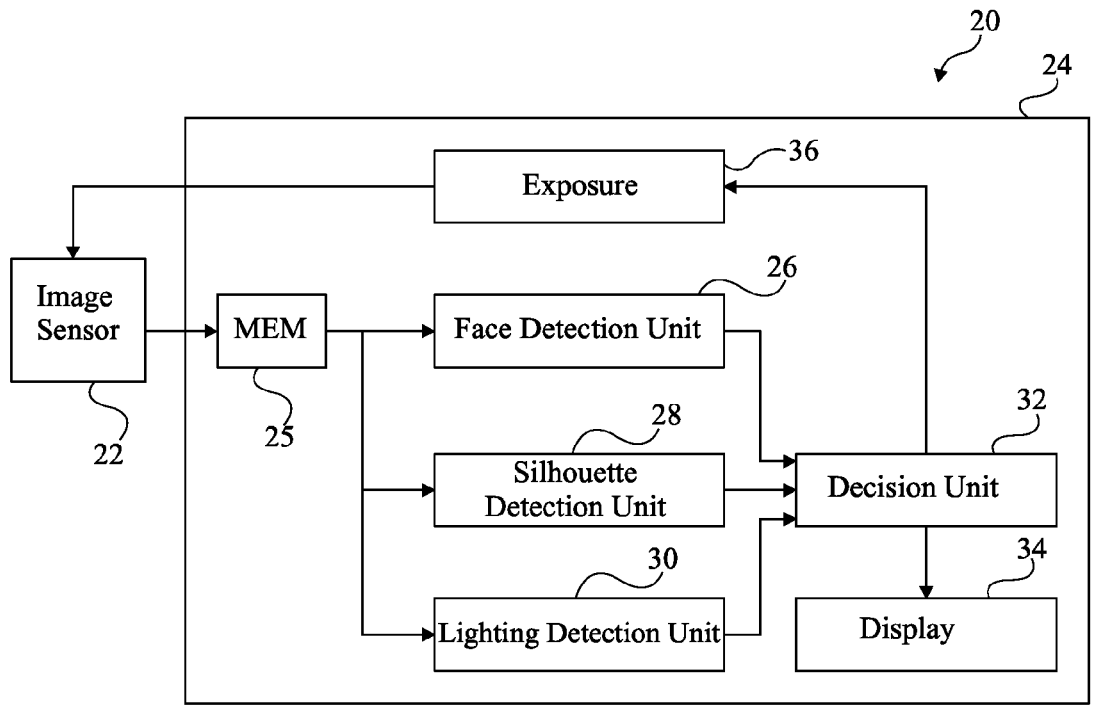
FIG. 2 shows an embodiment of a device for detecting objects in an image.

FIG. 2 shows an embodiment of a device 20 for detecting faces in images.

Device 20 comprises an image sensor 22 (Image Sensor). For example, this device is an image sensor according to a MOS (Metal Oxide Semiconductor) technology or a CCD (Charge-Coupled Device) technology. The frequency of acquisition of new images by sensor 22 varies, for example, from 10 Hz to 100 Hz. The images provided by sensor 22 may be color images or images in grey levels.

In operation, sensor 22 is exposed to a radiation and is capable of providing, for each image pixel, an electric signal representative of the amount of light received by the pixel during the duration of exposure of the pixel to the radiation.

Device 20 further comprises a detection unit 24. Detection unit 24 is capable of implementing a method of object detection, especially of face detection in the images provided by image sensor 22. The detection method implemented by detection unit 24 may be at least partly implemented in hardware fashion, that is, by a dedicated electronic circuit. As a variation, the detection method may be at least partly implemented by the execution, by detection unit 24, of instructions of a computer program, where the program may be stored in a memory.

Unit 24 comprises a memory 25 (MEM) where the images provided by image sensor 22 are stored. Unit 24 further comprises a unit 26 (Face Detection Unit) connected to memory 25 and configured to implemented a face detection algorithm in the images provided by image sensor 22. Unit 24 further comprises a unit 28 (Silhouette Detection Unit) connected to memory 25 and configured to implement a silhouette detection algorithm in the images provided by image sensor 22. Unit 24 further comprises a unit 30 (Lighting Detection Unit) connected to memory 25 and configured to determine a parameter representative of the lighting conditions during the acquisition of the images provided by image sensor 22. As a variation, it is possible not to connect unit 30 to memory 25 and to determine the parameter representative of the lighting conditions on acquisition of the images by on-the-fly analysis of the data flow transmitted by image sensor 22 to unit 24.

Units 26, 28, 30 are configured to provide signals to a decision unit 32 (Decision Unit) configured to determine whether at least one face is present in the images provided by image sensor 22. The results provided by unit 32 may be displayed on a display screen 34 (Display), stored in a memory, or printed on a printer.

Unit 32 is further configured to control a unit 36 (Exposure) for modifying the image exposure. Unit 36 is configured to control image sensor 22 to modify the exposure of the image provided by image sensor 22. This may be obtained by modifying the exposure time of image sensor 22 to acquire the images or by modifying the opening of the diaphragm of image sensor 22.

Figure 3:
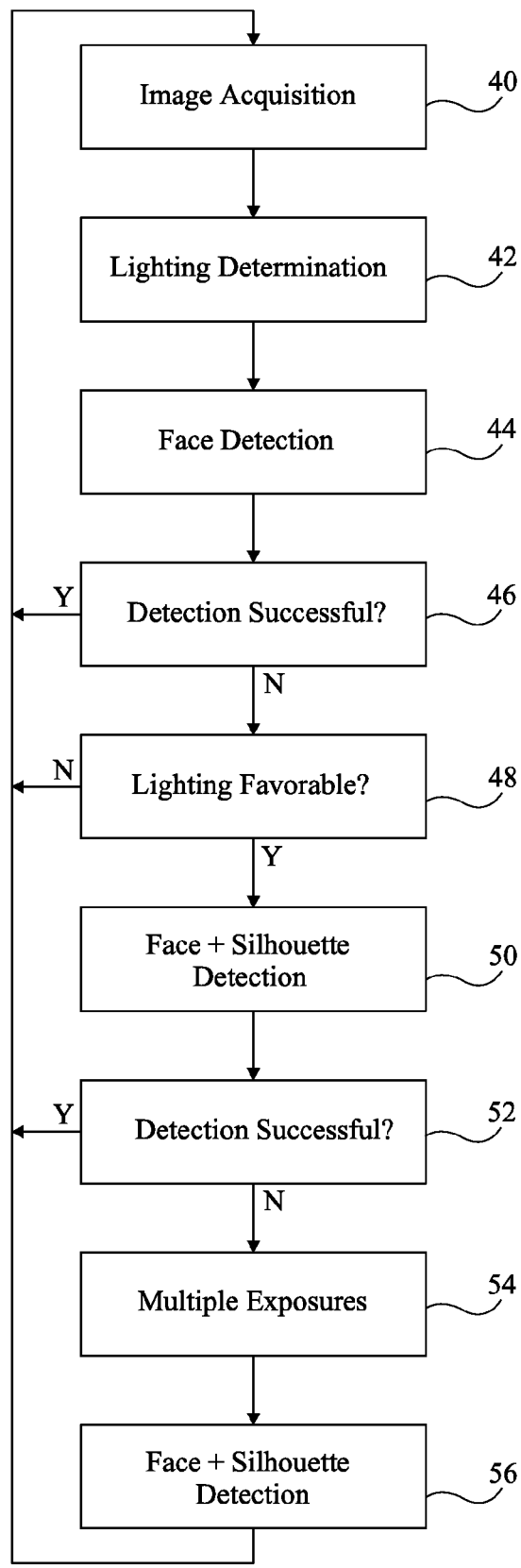
FIG. 3 shows, in the form of a block diagram, an example of a method for detecting objects in an image.

FIG. 3 shows, in the form of a block diagram, an embodiment of a face detection method implemented by device 20 shown in FIG. 2.

At step 40, a new image is acquired by image sensor 22. An image processing step may be provided. As an example, a processing may be performed to increase the image contrast. As an example, the image processing for example corresponds to a gamma correction, like at step 10 of the method previously described in relation with FIG. 1. The method continues at step 42.

At step 42, unit 30 determines, at a frequency smaller than the image acquisition frequency, for example, every 100 images, a parameter BL representative of the lighting conditions on acquisition of the new image at step 40.

An example of a method for determining parameter BL may comprise comparing the image provided by sensor 22 at step 40 with an additional image of the same scene obtained with a different exposure. As an example, the additional image is acquired by sensor 22 with a different exposure time, for example, twice the exposure time of the image acquired at step 40. The comparison may comprise determining a mean value G0 of the grey level of the pixels of the initial image and determining a mean value G1 of the grey level of the pixels of the additional image. Calling $t_1$ the exposure time of the additional image and $t_0$ the exposure time of 40, unit 30 determines parameter BL by the following relation (10):

$$BL=|G_0 * t_1 - G_1 * t_0| \tag{10}$$

As an example, exposure time to may vary from a few microseconds to 1 second.

When the lighting present on acquisition of the images is "usual," the mean value of the grey level of the pixels of the obtained images is substantially proportional to the exposure time used to acquire the image. Parameter BL is then small. When the lighting present on acquisition of the images is "unusual," for example, in the case of a back lighting or in the case of a strong front lighting, the grey level of many pixels of the images provided by image sensor 22 is maximum or minimum, that is, many pixels of the images provided by image sensor 22 are black or white and remain black or white even if the exposure time changes. A pixel for which the signal level provided for sensor 22 is minimum or maximum is said to be at the minimum or maximum level. In the case of an image in grey levels, the signal may be the grey level. In the case of a color image, the signal may be the level of a color component (for example, red, green, or blue in RGB representation). Thereby, the mean value of the grey level of the image pixels no longer varies substantially proportionally to the exposure time. This translates as an increase of parameter BL.

At step 44, a face detection algorithm is implemented by unit 26, like at step 12 of the method previously described in relation with FIG. 1. Unit 26 provides value Score, representative of the detection of a face in the image. The method continues at step 46.

At step 46, unit 32 determines whether a face has been detected in the image, like at step 14 of the method previously described in relation with FIG. 1. This may be obtained by comparing value Score with threshold Detection_Th. If a face has been detected, unit 32 may display 34 a signal indicating that a face has been detected in the image. The method then continues at step 40 with the acquisition of a new image. If, at step 46, there has been no face detection in the image, the method continues at step 48.

At step 48, unit 30 determines whether the lighting conditions on acquisition of the image provided by sensor 22 are favorable for the implementation of the silhouette detection algorithm. This may be obtained by comparing parameter BL with a threshold BL_Th. As an example, threshold BL_Th may be on the order of 25% of the maximum value that can be taken by parameter BL. If, at step 48, value BL is greater than or equal to threshold BL_Th, unit 32 considers that the lighting conditions are favorable. The method carries on at step 50. If, at step 48, parameter BL is strictly smaller than BL_Th, unit 32 considers that the lighting conditions are not favorable to implement the silhouette detection algorithm. In this case, it is considered that there has been no face detection in the image. Unit 32 may display 34 a signal indicating that no face has been detected in the image. The method then continues at step 40 with the acquisition of a new image.

At step 50, unit 28 implements a silhouette detection algorithm, like at step 16 of the method previously described in relation with FIG. 1. Unit 28 provides value GCorr to unit 32. The method continues at step 52.

At step 52, the unit determines whether a face has been detected, like at step 18 of the method previously described in relation with FIG. 1. Unit 32 may determine a new score NewScore, for example, by relation (9), and compare the new score NewScore with threshold Detection_Th. If new score NewScore is greater than or equal to threshold Detection_Th, unit 32 considers that an image has been detected and the method continues at step 40. Unit 32 may display 34 a signal indicating that a face has been detected in the image. If, at step 52, new score NewScore is strictly smaller than threshold Detection_Th, the method continues at step 54.

At step 54, image sensor 22 acquires several additional images of the same scene at different exposures. The first image corresponds, for example, to the initial image acquired at step 40. The acquisition of images at different exposures may be obtained by using different exposure times. As an example, at least three images may be obtained with different acquisition times. The exposure time of the second image is equal to half the exposure time of the first image and the exposure time of the third image is equal to twice the exposure time of the first image. As a variation, more than three images may be used. The method continues at step 56.

At step 56, units 26, 28 implement the face and silhouette determination algorithms and unit 32 determines a new score NewScore for each additional image. Based on the new scores obtained for the additional images, the method determines whether a face is detected in the additional images. As an example, it is considered that a face is present if a face is detected in at least one of the additional images.

If new score NewScore is greater than or equal to threshold Detection_Th for at least one of the additional images, unit 32 considers that a person has been detected and the method continues at step 40. Unit 32 may display on display 34 a signal indicating that a face has been detected in the image. If, at step 56, new score NewScore is smaller than threshold Detection_Th for each additional image, unit 32 considers that no image has been detected and the method continues at step 40.

The embodiment of the detection method has the advantage of only implementing the silhouette detection algorithm in cases where it can operate properly. Such is in particular the case for back lit images or for images with a strong front lighting. Further, the detection method provides acquiring more than two images with different exposure times only in cases where the implementation of the face detection and silhouette detection algorithm in the image provided by sensor 22 at step 40 has not yielded any result. Thereby, additional computing operations due to the processing of additional images are only performed in the case where there still has been no face detection in the image provided by sensor 22 at step 40.

The embodiment of the method advantageously enables simultaneously decreasing the number of detection failures and the number of wrong detections.

Specific embodiments of the present invention have been described. Various alterations, modifications, and improvements will occur to those skilled in the art. In particular, although the obtaining of additional images by modification of the exposure of image sensor 22 has been described at step 54, the additional images may be obtained by modifying the lighting of the scene used during the acquisition of each additional image.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for detecting an object in an image comprising a pixel array using an image processing device, the method comprising:
    using the image processing device to search out the object in the image;
    determining whether pixels of the image are at a minimum or maximum level; and
    searching out a silhouette of the object in the image only if pixels of the image are at the minimum or maximum level and the object has not been found in the image when searching out the object in the image;
    wherein searching out the object comprises providing a first score and searching out the silhouette comprises providing a second score and wherein the presence of the object in the image is determined based on the first and second scores.

2. The method of claim 1, further comprising acquiring the image.

3. The method of claim 2, wherein determining whether the pixels of the image are at the minimum or maximum level comprises:
    acquiring at least one additional image at an exposure or under a lighting different from those of the image; and
    determining whether the pixels of the image are at the minimum or maximum level based on an analysis of the image and of the additional image.

4. The method of claim 2, wherein the image is acquired with a first exposure time (t0) and wherein determining whether the pixels of the image are at the minimum or maximum level comprises:
    acquiring an additional image at a second exposure time (t1) different from first exposure time t0;
    determining a first mean value of the grey level (G0) of the pixels of said image;
    determining a second mean value (G1) of the pixels of the additional image; and
    determining a lighting condition parameter (BL) by the relation $BL=|G0*t1-G1*t0|$.

5. The method of claim 4, wherein determining whether the pixels of the image are at the minimum or maximum level comprises determining that the pixels are at the minimum or maximum level if parameter BL is greater than a threshold.

6. The method of claim 1, wherein the searching is repeated for each image among successive images acquired by an image sensor at an image acquisition frequency.

7. The method of claim 6, wherein determining whether the pixels of the image are at the minimum or maximum level is carried out for some of the successive images at a frequency that is less than the image acquisition frequency.

8. The method of claim 1, further comprising:
    acquiring additional images at different exposures or lightings with respect to the image; and
    searching out the object and the silhouette of the object in the additional images.

9. The method of claim 8, wherein the image is acquired with a first exposure time and wherein one of the additional images is acquired with a third exposure time that is greater than the first exposure time.

10. The method of claim 9, wherein another one of the additional images is acquired with a fourth exposure time that is less than the first exposure time 11. The method of claim 1, wherein the object to be detected is a face.

12. The method of claim 1, wherein the image processor device includes a dedicated electronic circuit so that the method is at least partly implemented by the dedicated electronic circuit.

13. The method of claim 1, wherein the method is at least partly implemented by execution, by the image processing unit, of program instructions, wherein the program instructions are stored in a memory.

14. A method for detecting an object, the method comprising:
    acquiring an image using an image sensor, the image comprising an array of pixels;
    determining by a processor whether pixels of the first image are at a minimum or maximum level;
    searching for the object in the image; and
    searching for a silhouette of the object in the image if the object has not been found in the image when searching out the object in the image and the pixels of the image are at the minimum or maximum level;
    wherein searching for the object comprises providing a first score and searching for the silhouette comprises providing a second score, the method further comprising determining the presence of the object in the image based on the first and second scores.

15. The method of claim 14, wherein determining whether the pixels of the image are at the minimum or maximum level comprises:
    acquiring at least one additional image at an exposure or under a lighting different from those of the image; and
    determining whether the pixels of the image are at the minimum or maximum level based on an analysis of the image and of the additional image.

16. The method of claim 14, wherein the image is acquired with a first exposure time (t0) and wherein determining whether the pixels of the image are at the minimum or maximum level comprises:
    acquiring an additional image at a second exposure time (t1) different from first exposure time t0;
    determining, by a processor, a first mean value of the grey level (G0) of the pixels of said image;
    determining a second mean level (G1) of the pixels of the additional image; and
    determining a lighting condition parameter (BL) by the relation $BL=|G0*t1-G1*t0|$.

17. The method of claim 16, wherein determining whether the pixels of the image are at the minimum or maximum level comprises determining that the pixels are at the minimum or maximum level if parameter BL is greater than a threshold.

18. The method of claim 14, wherein the searching steps are repeated for each image among successive images acquired by the image sensor at an image acquisition frequency and wherein determining whether the pixels of the image are at the minimum or maximum level is carried out for some of the successive images at a frequency strictly that is less than the image acquisition frequency.

19. The method of claim 14, further comprising:
acquiring additional images at different exposures or lightings with respect to the image; and
searching out the object and the silhouette of the object in the additional images.

20. The method of claim 19, wherein the image is acquired with a first exposure time and wherein one of the additional images is acquired with a third exposure time that is greater than the first exposure time and wherein another one of the additional images is acquired with a fourth exposure time that is less than the first exposure time.

21. The method of claim 14, wherein the object to be detected is a face.

22. A device for detecting an object in an image, the device comprising:
a memory configured to store the image; and
a processing unit coupled to the memory, the processing unit configured to search out the object in the image and to search out a silhouette of the object in the image only if image pixels are at a minimum or maximum level and the object has not been found in the image when searching out the object in the image;
wherein searching for the object comprises providing a first score and searching for the silhouette comprises providing a second score, the method further comprising determining the presence of the object in the image based on the first and second scores.

23. The device of claim 22, further comprising an image sensor coupled to the memory.

24. The device of claim 23, wherein the image sensor comprises a CCD or a CMOS image sensor.

25. The device of claim 22, wherein the processing unit comprises:
a face detection unit configured to detect the object in the image; and
a silhouette detection configured to detect the silhouette of the object in the image.

26. The device of claim 25, wherein the processing unit further comprises a lighting detection unit configured to detect a lighting characteristic of the image.

\* \* \* \* \*